United States Patent [19]

Shackle

[11] Patent Number: 5,396,153
[45] Date of Patent: Mar. 7, 1995

[54] PROTECTION CIRCUIT FOR ELECTRONIC BALLASTS WHICH USE CHARGE PUMP POWER FACTOR CORRECTION

[75] Inventor: Peter W. Shackle, Arlington Heights, Ill.

[73] Assignee: Motorola Lighting, Inc., Buffalo Grove, Ill.

[21] Appl. No.: 164,243

[22] Filed: Dec. 9, 1993

[51] Int. Cl.⁶ .......................................... H05B 41/16
[52] U.S. Cl. .................................. 315/247; 315/205; 315/209 R; 315/225; 315/DIG. 5; 315/DIG. 7
[58] Field of Search ................ 315/247, 224, 244, 219, 315/287, 291, 307, 205, 240, DIG. 5, DIG. 7, 209 R, 225

[56] References Cited

U.S. PATENT DOCUMENTS

| | | | |
|---|---|---|---|
| 4,017,785 | 4/1977 | Perper | 321/4 |
| 4,808,887 | 2/1989 | Fuhnrich et al. | 315/247 |
| 5,010,277 | 4/1991 | Courier de Mere | 315/200 |
| 5,099,407 | 3/1992 | Thorne | 315/DIG. 7 X |

FOREIGN PATENT DOCUMENTS 2115627A 2/1982 United Kingdom .

*Primary Examiner*—Robert J. Pascal
*Assistant Examiner*—Haissa Philogene
*Attorney, Agent, or Firm*—J. Ray Wood

[57] ABSTRACT

A protection circuit for electronic ballasts which use charge pump power factor correction includes a switch with an overvoltage sensor, a resistor and a diode. In the event of a fault condition, the switch disables the charge pump power factor correction, while the resistor and diode prevent the switch dissipating unduly large amounts of energy.

9 Claims, 1 Drawing Sheet

PROTECTION CIRCUIT FOR ELECTRONIC BALLASTS WHICH USE CHARGE PUMP POWER FACTOR CORRECTION

BACKGROUND OF THE INVENTION

Power conversion circuits such as DC (direct current) power supplies and electronic ballasts frequently use a rectifier circuit to convert the incoming AC (alternating current) line power into DC power, which is then stored in a large electrolytic storage capacitor as a stable source of DC power for the system. The disadvantage of such arrangements is that the incoming line current is taken in the form of a large spike each time the power line voltage rises above the voltage of the storage capacitor. These current spikes are not proportional to the line voltage in the manner preferred by electric utility companies, and are characterized as having a poor power factor. The ideal situation is that the current drawn from the power line should be directly proportional to the voltage and in phase with it, in which case the power factor is said to be unity, i.e., there is exact correspondence in wave shape between the incoming voltage and the current which is drawn.

Many schemes for causing the current drawn from the power line to be sinusoidal have been described. One particular idea is to take some power from the output of the system and use it to pull current in from the AC power line with a sinusoidal waveform. One example of such a scheme is that described by Steigerwald in U.S. Pat. No. 5,113,337 for DC power supplies. Another analogous scheme for electronic ballasts was described by Mere in U.S. Pat. No. 5,134,556. These circuits are characterized by the presence of a charge pump. In these charge pumps, high frequency AC voltages at the output of the system are used to drive an arrangement of capacitors and diodes so that charge is "pumped" out of the AC power line and into the storage capacitor. With good control of the pumping voltage and correct sizing of the pumping capacitor, power factors of 0.999 may be achieved, implying that the current drawn from the power line is almost purely sinusoidal when the voltage is sinusoidal. These techniques are referred to as "charge pump power factor correction".

Although charge pump power factor correction is an effective and economical means of achieving power factor correction, all the schemes described have in common the following disadvantage: When the output load is removed, the charge pump will continue to operate so that the system will continue to extract energy from the power line even though no energy is being drawn from the output. Unless precautions are taken to avert this situation, the system will continue to absorb energy until it self-destructs through failure of some component. The methods by which the system is protected must be simple and inexpensive.

DESCRIPTION OF THE PREFERRED EMBODIMENT

Figure 1:
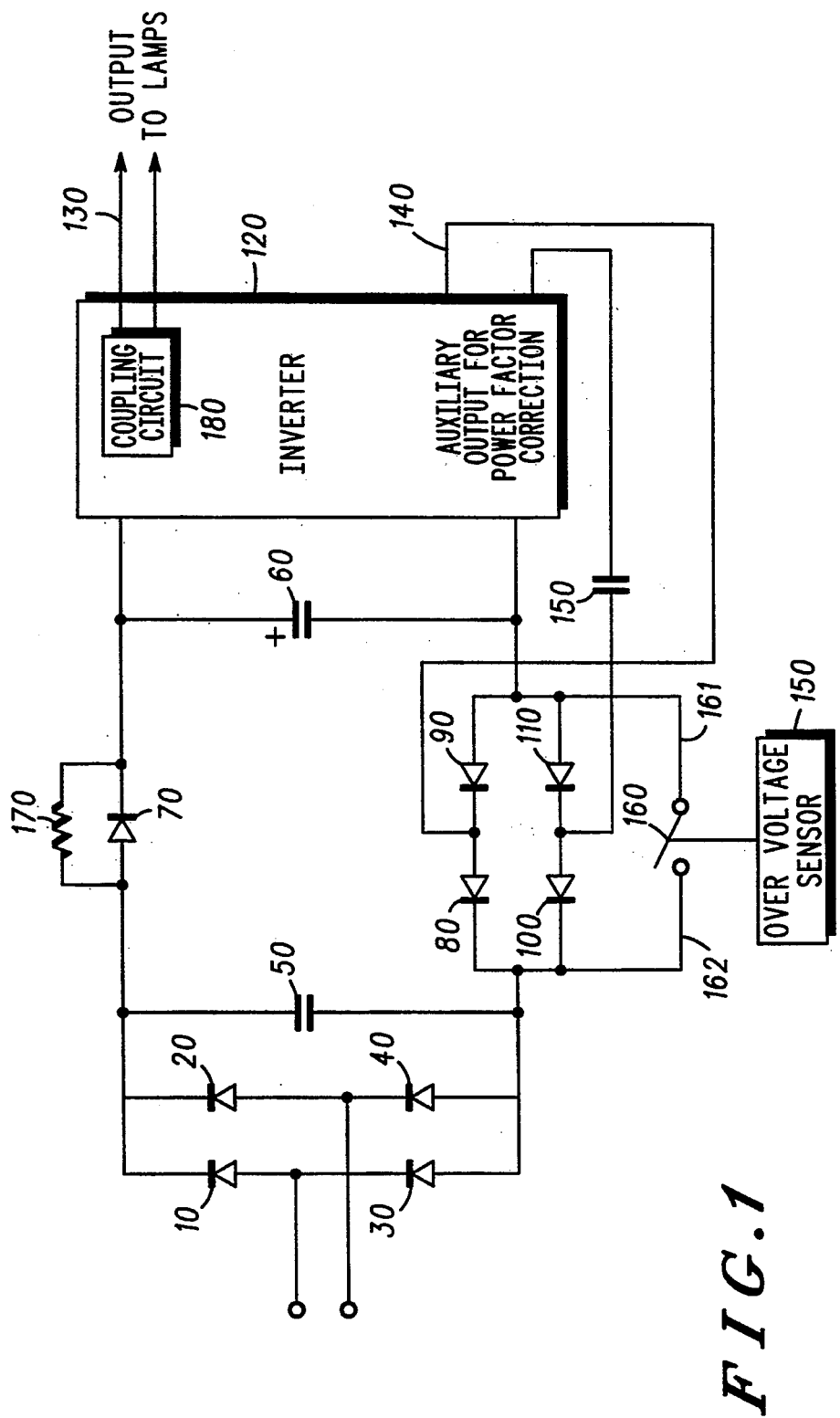
FIG. 1 shows the principal parts of an electronic ballast circuit embodying charge pump power factor correction, with a low cost protection scheme embodied.

A simple, inexpensive circuit for protecting and shutting down an electronic ballast with charge pump power factor correction in the circumstances where its load has been removed keeps the inverter operating so that normal operation may resume when the load is replaced. The implementation of such a protection circuit involves adding a switch with an overvoltage sensor, a resistor and a diode. In the event of a fault condition, the switch disables the charge pump power factor correction, while the resistor and diode prevent the switch dissipating unduly large amounts of energy.

In FIG. 1, rectifier diodes 10, 20, 30 and 40 are used to convert the 60 Hz (hertz) AC power into pulsating DC power. Smoothing capacitor 50 is used to prevent high frequency noise from the operation of the circuit from escaping onto the AC power line. The DC charge produced by the action of the 60 Hz rectifier is stored on electrolytic capacitor 60. High frequency diodes 70, 80, 90, 100, 110 connect the 60 Hz rectifier to the storage capacitor 60. The inverter 120 which produces relatively high frequency (35 KHz) power to drive a load comprising of discharge lamps is connected across storage capacitor 60. The inverter 120 has two outputs. Output 130 is used to drive the discharge lamp load, while output 140 is used to feed power back to the high frequency diodes 80, 90, 100, 110 through the charge pump capacitor 150. Sometimes the output 140 may be derived inside the inverter from the coupling circuit 180 which is used to join the inverter onto the lamps.

When the circuit is operating normally, the peak voltage across the rectifiers 80 and 90 is adjusted to be equal to the voltage on the capacitor 60 which is equal to the peak voltage of the AC power line. The voltage across capacitor 50 tracks the AC power line voltage, varying from zero to peak line voltage. If the load is abruptly removed, the action of the charge pump will continue to cause charge to be drawn from the line and stored in capacitor 60, so that the voltage on capacitor 60 will increase rapidly. This rapid build up of voltage can be sensed either on capacitor 60 or at other points in the system and used to trigger the overvoltage sensor 150. The triggering of over voltage sensor 150 causes the closure of switch 160. This short circuits the output of the high frequency rectifiers 80, 90, 100,110, stopping all charge pumping into storage capacitor 60 and limiting the voltage on capacitor 60 to the peak voltage of the AC power line.

When switch 160 closes, then if the incoming power line voltage is close to the line voltage zero crossing at the moment of closure, current will flow from the large storage capacitor 60 into smoothing capacitor 50, bringing the voltage on smoothing capacitor 50 abruptly up to the peak of the line voltage. When this happens, an extremely large current will flow through the switch 160, and energy equal to the energy of capacitor 50 being charged to the peak of the line will be dissipated in switch 160, possibly causing switch 160 to melt and fail. An obvious solution to this problem is to make switch 160 extremely large and expensive, so that it can dissipate large amounts of energy. However, since electronic ballasts should be inexpensive and switch 160 is used infrequently, this is most undesirable.

A preferred solution, shown incorporated in FIG. 1, is to place diode 70 shunted by resistor 170 in the circuit as shown. In normal operation, current flows with a half sinusoidal waveform forwards through diode 70 and into storage capacitor 60. However, at the moment of a fault condition when switch 160 closes, since capacitor 60 will always have greater voltage than capacitor 50, then positive charge will always try and flow out of the positive terminal of capacitor 60 and into the upper terminal of capacitor 50. This current flow is in the opposite direction to the normal flow of current. Hence, diode 70, which has no effect in normal operation, becomes reverse biased and prevents the fault current from flowing out of capacitor 60 and into capacitor 50. Instead, the current is forced to flow through resistor 170. Resistor 170 limits the current which flows when switch 160 closes, and all the energy which has to be dissipated when the two capacitors 50 and 60 are brought abruptly to the same voltage is dissipated harmlessly in the relatively large, inexpensive resistor 170. Under normal conditions negligible current flows through resistor 170.

With the arrangement just described, switch 160 can be a small, inexpensive switch since it neither carries large current surges nor dissipates large amounts of energy. While the fault condition persists and switch 160 is closed, the inverter continues to run, ready to energize a lamp when connected. The power being drawn from the line has no power factor correction, which is acceptable since the energy being drawn is much reduced. While switch 160 is closed, the output of the short circuited charge pump which flows through switch 160 is flowing from switch terminal 162 towards switch terminal 161. However, twice each line cycle the capacitor 60 is charged by the peak of the line voltage, and at this moment a large current flows for roughly a millisecond in the direction from terminal 161 towards terminal 162. Normally this current will flow mostly through high speed rectifier diodes 80, 90, 100, 110. As this happens, the voltage polarity across switch 160 is reversed for about a millisecond. Thus, switch 160 can be constructed if desired using an inexpensive, low current, low frequency thyristor, since this periodic reversal of the voltage across it serves to turn it off and sweep out stored minority carriers.

I claim:

1. A circuit for powering a gas discharge lamp from a source of AC power comprising:

a first rectifier having a first rectifier input and a first rectifier output, the first rectifier input coupled to the source of AC power;

a smoothing capacitor coupled in parallel with the first rectifier output;

a diode with a shunt resistor; a second rectifier having a second rectifier input and a second rectifier output;

the second rectifier input coupled to a source of high frequency power;

a switch across the second rectifier output;

a storage capacitor in parallel with an inverter for driving a gas discharge lamp;

the smoothing capacitor, the diode with shunt resistor, the energy storage capacitor and the second rectifier output connected in series.

2. The circuit of claim 1 including a sensor for sensing conditions when the voltage on the energy storage capacitor is excessively high.

3. The circuit of claim 2 where the switch is open during normal operation and where the sensor is coupled to the switch such that the switch is closed when the voltage on the energy storage capacitor is excessively high.

4. The circuit of claim 1 where the source of high frequency AC power is derived from the inverter.

5. The circuit of claim 1 where the inverter includes a coupling circuit for coupling to the gas discharge lamps, and where the source of high frequency AC power is derived from the coupling circuit.

6. A circuit for powering a gas discharge lamp from a source of AC power comprising:

a first rectifier having a first rectifier input and a first rectifier output, the first rectifier input coupled to the source of AC power;

a smoothing capacitor coupled in parallel with the first rectifier output; a diode with a shunt resistor;

a second rectifier having a second rectifier input and a second rectifier output;

the second rectifier input coupled to a high frequency inverter;

a switch across the second rectifier output;

a storage capacitor in parallel with an inverter for driving a gas discharge lamp;

a sensor for sensing conditions when the voltage on the energy storage capacitor is excessively high;

the smoothing capacitor, the diode with shunt resistor, the energy storage capacitor and the second rectifier output connected in series.

7. The circuit of claim 2 where the switch is open during normal operation and where the sensor is coupled to the switch such that the switch is closed when the voltage on the energy storage capacitor is excessively high.

8. The circuit of claim 1 where the inverter includes a coupling circuit for coupling to the gas discharge lamps, and where the source of high frequency AC power is derived from the coupling circuit.

9. A method of a powering a gas discharge lamp from a source of AC power at a first frequency comprising the steps of:

rectifying the AC power into a first DC power;

inverting the first DC power into AC power at a second higher frequency;

rectifiying some of the AC power at a second high frequency into a second DC power;

storing some of the first DC power and second DC power in an energy storage capacitor;

energizing the gas discharge lamp with the AC power at the second frequency;

sensing when the voltage on the energy storage capacitor is excessively high disabling the rectifying of some of the AC power at a second higher frequency into a second DC power if the voltage on the energy storage capacitor is excessively high.

* * * * *